March 9, 1926.
H. RICHARDSON
CAR UNLOADER
Filed June 27, 1925    4 Sheets-Sheet 1
1,576,360
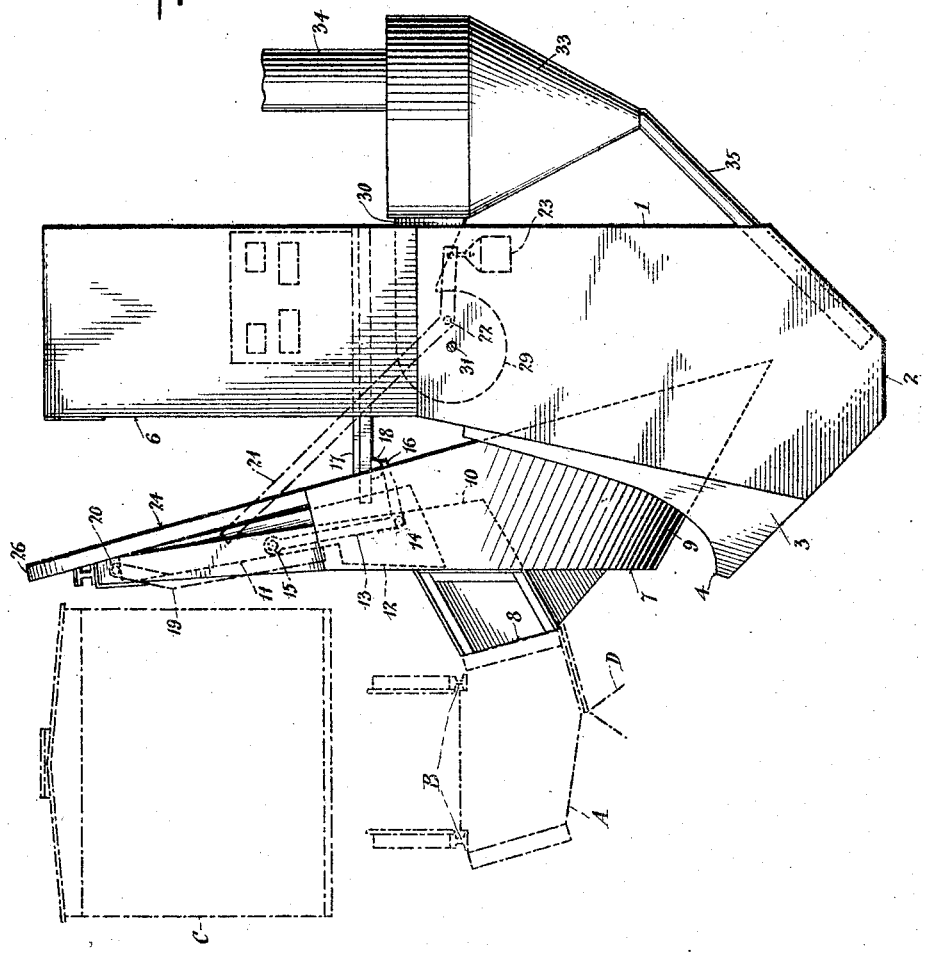
Inventor
Henry Richardson,
By
Attorney

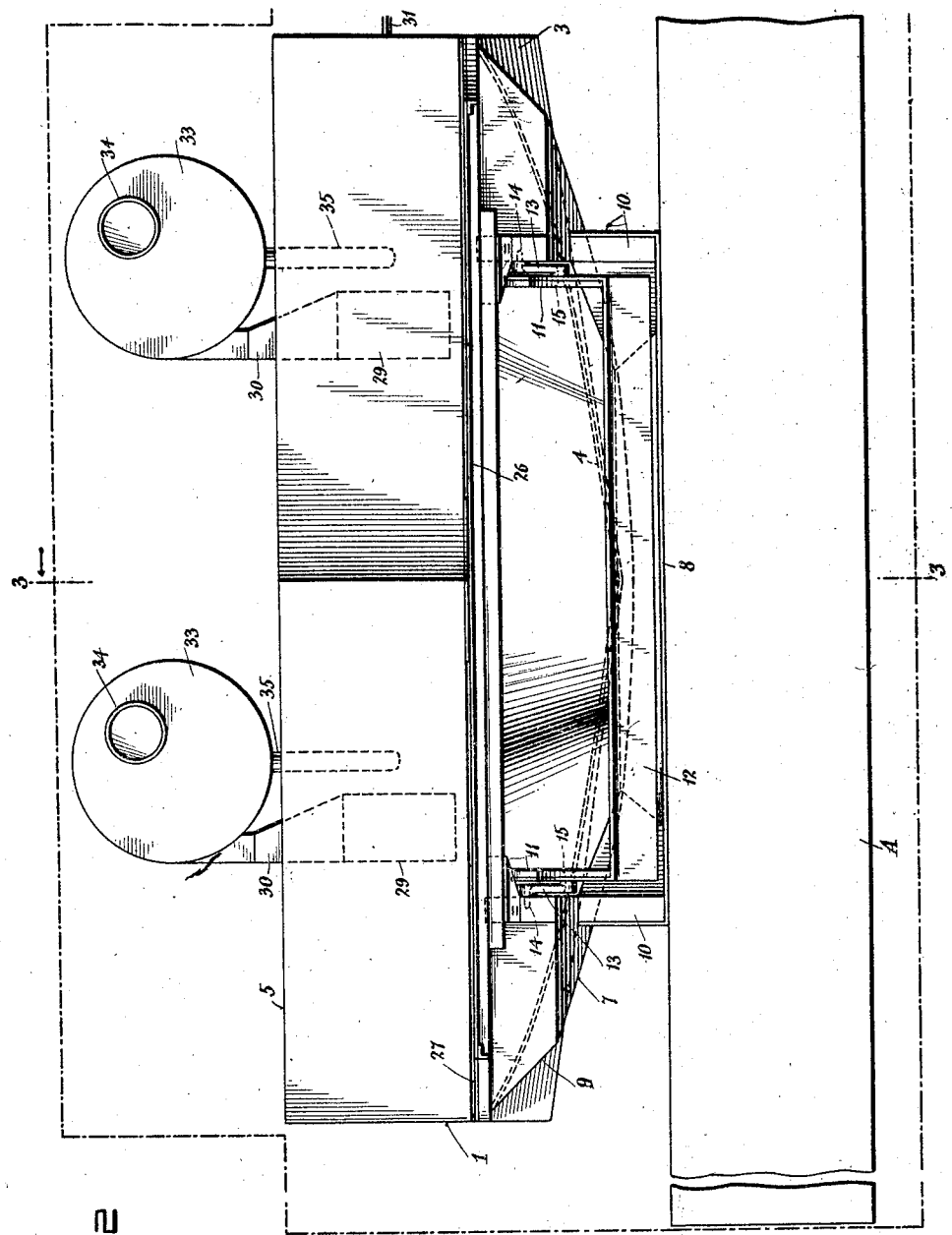

March 9, 1926.
H. RICHARDSON
CAR UNLOADER
Filed June 27, 1925      4 Sheets-Sheet 3
1,576,360
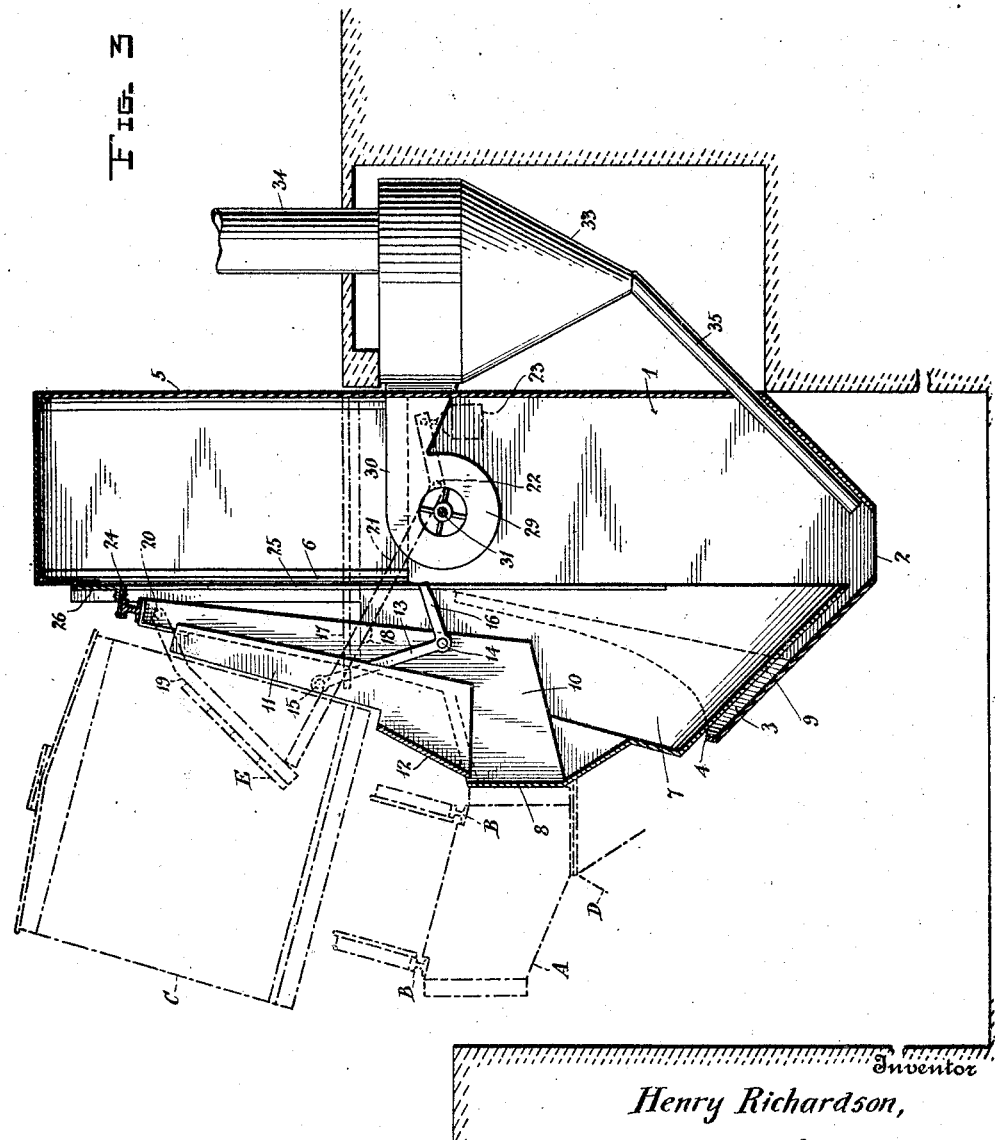

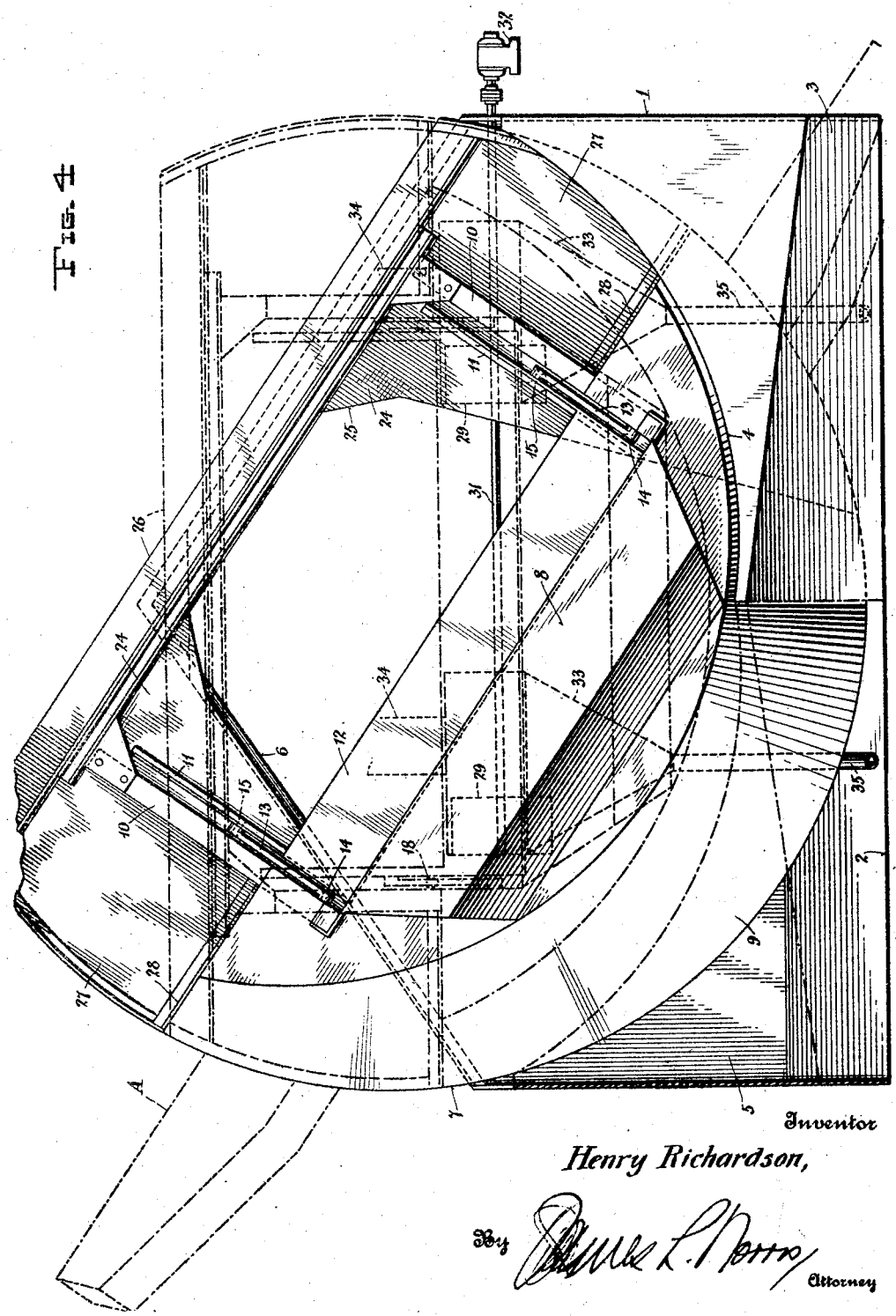

Patented Mar. 9, 1926.

1,576,360

UNITED STATES PATENT OFFICE.

HENRY RICHARDSON, OF PASSAIC, NEW JERSEY.

CAR UNLOADER.

Application filed June 27, 1925. Serial No. 40,003.

*To all whom it may concern:*

Be it known that I, HENRY RICHARDSON, a subject of the King of Great Britain, residing at Passaic, in the county of Passaic and State of New Jersey, have invented certain new and useful Improvements in Car Unloaders, of which the following is a specification.

The present invention relates to improvements in car unloaders of the class adapted for use in the dumping or unloading of railway box-cars loaded with grain in bulk, a car unloader of this class being shown and described in my prior Patent No. 1,364,808, granted January 4, 1921, and the primary object of the invention is to provide means for preventing the escape of dust created incident to the flow of the grain from the car to a receiving hopper or other receptacle.

It has been found, in operating car unloaders of this class, that a considerable amount of dust is released from the grain as the latter flows from the car and drops into the receiving hopper, and no means has been heretofore employed to prevent the escape of such dust to the outside air. In consequence, the objections have been presented that the air in the region surrounding the car unloader has been heavily laden with this dust, thus hampering the operation of the unloader and creating an unfavorable atmosphere in which the attendants were required to work, and furthermore, the escape of the dust from the grain amounted to a loss or shrinkage in the load discharged from each car.

The present invention obviates these objections. It provides means whereby the clearance space between the receiving hopper and the side of the car, around the door or opening therein through which the grain is discharged, is substantially closed or sealed to and extend sufficient to prevent the escape of an appreciable amount of dust from the interior of the receiving hopper or the car to the outside air, and preferably suction means is provided which will produce an inward draft through any openings or crevices that may remain between the receiving hopper and the car. The suction means may advantageously be of a type of dust separator or collector which will separate the dust from the air and discharge the dust-freed air to the exterior of the hopper and return the dust to the grain in the receiving hopper. Thus, the invention avoids the formation of a dust cloud about the car unloader during its operation, and it enables the dust to be weighed with the grain dumped or unloaded from each car, and, hence, there will be no shrinkage or loss of weight of the load or contents of each car.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 is an end elevation of a car unloader and receiving hopper equipped with dust confining and separating means constructed in accordance with the present embodiment of the invention;

Figure 2 is a top plan view of the structure shown in Figure 1;

Figure 3 represents a vertical section taken on the line 3—3 of Figure 2, the parts being shown in the relative positions which they occupy, when the car has been tilted incident to the unloading thereof; and Figure 4 is an elevation of the structure shown in Figure 3 looking toward the right in said figure, the dust-confining means being shown in normal horizontal position by the dotted lines and in endwise tilted position by the full lines.

Similar parts are designated by the same reference characters in the different views.

The present invention is applicable generally to car unloaders of the type employing a bridge or platform on which a car containing the grain or other material is placed and which is operative to tilt the car either laterally or in an endwise direction or is operable to tilt the car first laterally and then in and endwise direction to alternately elevate the opposite ends of the car, the grain flowing from the car through the usual door in the side thereof. The invention in the present instance is shown applied to a car unloader of the type fully illustrated and described in my prior patent referred to above, wherein the car is caused to tilt first laterally and then endwise in directions to alternately elevate the opposite ends of the car, but it would be understood that the invention is not restricted to a car unloader of that particular type as it may be used in conjunction with other or equivalent types of car unloaders. While the preferred construction of the dust-confining and separating means is shown in the accompanying drawing and will be hereinafter described in detail, it is to be understood that the invention is not restricted to the precise construction shown, as equivalent constructions are contemplated and such will be included within the scope of the claims.

In the present instance, A represents the bridge or platform having rails B thereon to receive the car wheels and C represents the body of a car which is of the box car or similar type such as that generally used for the railway transportation of grain, such cars having a door in the side thereof through which the grain is discharged or unloaded. The bridge A is so mounted that it may occupy the position shown in Figure 1 wherein the car rails are of equal relative height, the bridge being then in position to receive or discharge a car with respect to adjoining rails, and the bridge may be tilted laterally or into the position indicated in Figure 3, in consequence of which the car on the bridge will be correspondingly tilted; and while the bridge occupies such laterally tilted position, it is adapted to rock or tilt in an endwise direction about a transverse axis, so that the opposite ends of the car are alternately elevated in order to cause the grain in those parts of the car to flow toward and out through the door opening in the side of the car which is relatively depressed. The knife edge or bearing D about which the lateral or side tilt of the car takes place is indicated diagrammatically in Figures 1 and 3, this knife edge intersecting the transverse axis about which the endwise tilt of the bridge takes place, but reference is made to my prior patent above referred to for a complete illustration and description of the manner in which the bridge may be mounted and tilted, both laterally and endwise.

1 designates a form of receiving hopper into which the load in the car may be dumped and from which the grain may be transferred, by a conveyor or other suitable means to a grain elevator or other place of storage, the hopper being shown in the present instance as provided with an opening 2 in its bottom through which the grain may pass to a conveyor which may be arranged to operate beneath the hopper. The hopper is provided with a portion 3 which extends toward the bridge of the unloader and this portion of the hopper forms a lip or edge 4 which is curved to conform substantially with the surface of a cone, the axis of which is coincident with the transverse axis about which the bridge tilts endwise while tilted laterally. The portion 3 of the hopper is preferably flat, or substantially so, as shown, and the lip 4 is turned at an angle thereto in order to provide a clearance space as will hereinafter appear. The ends, top and rear side of the hopper are covered by sheet metal 5 or other suitable means so that these portions of the hopper form a dust-tight closure. The front of the hopper or the side thereof toward the bridge is provided with an opening 6 which is of sufficient size to admit the grain thereto from the car and to accommodate the dust-confining means and other operative parts which are interposed between the hopper and the car and bridge. An apron 7 is provided which directs the grain flowing from the car into the hopper and constitutes a part of a closure for the opening in the hopper. As shown, this apron is fixed at 8 to the side of the bridge adjacent to the hopper and at a point beneath the car floor and offset inwardly from the side of the car body so that it will receive the grain flowing from the car, and the attachment of this apron to the bridge causes the apron to tilt both laterally and in an endwise direction in unison with the corresponding tilting movements of the bridge. Figure 1 shows the position occupied by this apron when the bridge is in its normal or upright position, and Figure 2 shows the position occupied by the apron when the bridge is tilted laterally. The peripheral portion 9 of the apron telescopes or fits within the portion 3 of the relatively stationary receiving hopper, this peripheral portion 9 of the apron being formed as part of the surface of a cone the axis of which coincides with the tilted transverse axis about which the endwise tilting movements of the bridge take place. As shown, the peripheral portion 9 of the apron forms part of a 45° cone, and the relatively fixed extension 3 of the receiving hopper into which this portion of the apron telescopes is formed so that it accommodates the apron. (See Fig. 3.) By forming the apron in the manner described and locating its axis as stated, a relatively close fit or joint will be maintained between the apron 7 and the concentric edge 4 of the hopper while the bridge is tilted laterally and during the endwise tilting movements of the bridge, thereby substantially confining the dust within the receiving hopper, or at least leaving a small space which will confine most of the dust. The telescopic arrangement of the apron within the portion 3 of the hopper prevents the leakage of grain between these parts and the clearance space between the apron and the portion 3 of the hopper serves to accommodate any grain that may lodge or accumulate between these parts and thus avoid interference with the movements of the apron.

The top of the apron 7 is open to receive the grain from the car and the present invention provides means for effectively closing the space between the car body and the adjacent side of the hopper, in the region above the apron 7, to prevent the escape of the dust released from the discharging grain. Preferably, and as shown in the present instance, this dust-excluding means is carried by the bridge A. For this purpose, a pair of rigid arms 10 are fixed at their lower ends to the bridge and extend upwardly therefrom so that they occupy a position between the car body and the hopper. Sufficient space is provided between these arms and the side of the car to allow for variations in the widths of different car bodies and to insure ample clearance between the car bodies and these arms. These arms serve to support a pair of guards or plates 11 which are provided for the purpose of closing the clearance space between the arms 10 and the car body and the side of the car at opposite sides of the door opening therein and a plate 12 which connects the lower ends of the plates 11 and serve to substantially close the space between the floor of the car and the top of the apron 7. The dust-confining means comprising the plates 11 and 12 are mounted movably with respect to the arms 10 so that they may be retracted normally or while a car is being brought onto or removed from the bridge, thus affording the required amount of clearance, and such dust-confining means is movable toward the car after the same has been properly located on the bridge for unloading, the plates 11 then fitting closely against the side of the car body at opposite sides of the door opening therein to prevent escape of dust at these points and the plate 12 moving into a position beneath the car floor and thus closing the space between it and the top of the apron. Figure 1 shows such dust-confining means in its normal or retracted position and Figure 3 shows such means in its extended or operative position.

Different means may be employed for mounting the dust-confining means comprising the plates 11 and 12, but it is preferable to employ means which will automatically retract such means and hold it in retracted position, as shown in Figure 1, when the bridge moves into and occupies its normal upright position and which causes such dust-excluding means to automatically move into operative relation with the car when the bridge is tilted laterally. Such supporting means is shown in the present instance, it comprising a pair of bell-crank levers 13 arranged adjacent to the respective upright plates 11, each of these levers being pivoted to the respective supporting arm 10 by the pivot pin 14 and pivotally connected to the respective plate 11 by the pivot pin 15. The other arm 16 of each bell-crank lever projects beneath a relatively fixed platform 17 mounted on the receiving hopper and is in a position to engage an abutment 18 on the under side of said platform. The disposition of the pivot 15 with respect to the pivot 14 is such that the weight of the plates 11 and 12 will tend to cause descent thereof, and as the pivot pin 15 swings about the pivot pin 14, descent of the plates 11 and 12 will cause an inward swing thereof toward and against the car, as shown in Fig. 3. The bell-crank levers 13 are free to swing in this way while the bridge is tilted as the arm 16 of each bell-crank lever is then clear of the respective abutment 18. However, when the bridge returns to its normal or upright position, the end 16 of each bell-crank will encounter the respective abutment 18 and the final portion of the return movement of the bridge will cause the bell-crank levers 13 to rock about their pivots 14 in a direction to swing the pivot pins 15 outwardly or away from the side of the car, in consequence of which the plates 11 and 12 will be retracted into the positions shown substantially in Figure 1. As the abutments 18 continue to engage the bell-crank levers while the bridge occupies its normal or car-receiving and discharging position, the plates 11 and 12 will be retained in their retracted position, as is shown in Fig. 1, thus insuring proper running clearance at the side of the car. It will be understood that the initial part of the lateral tilt of the bridge causes the arms 16 of the bell-crank levers to recede or move downwardly from the abutments 18 and this relative recession of the bell-crank levers allows the plates 11 and 12 to descend under their own weight and, in consequence, to move laterally toward and into engagement with the car, thus insuring a substantially dust-tight closure between the car body and the arms 10 and the top of the apron 7 preparatory to the discharge of the grain from the car.

A door opener is preferably provided to push in the boards nailed across the inside of the car door opening to form the grain door, as usually employed. In the present instance, a door opener 19 is provided which is suspended or hung from pivots 20 supported by the upper ends of the arms 10 so that it may swing inwardly through the door opening and remove or push inwardly the boards E comprising the grain door. Preferably, the door opener is actuated during the lateral tilting movement of the car body, the weight of the tilted car being utilized to aid in forcing in the grain door against the weight of the grain contained in the car. As shown, the door opener is arranged to be actuated by a pair of levers 21 which are pivoted at 22 to suitable relatively fixed supports, the opposite or free ends of these levers being arranged to engage or abut against the lower portions of the door opener 19 at or toward its opposite sides. Normally, these levers 21 will be swung upwardly or into the inoperative position shown in Figure 1, and counterweights 23 may be provided on these levers to normally hold them in such position, but preparatory to the tilting of a car to unload it, the levers 21 are swung downwardly, thus bringing the lower end of the door opener 19 to bear against the outer sides of the grain door in the side of the car and while the levers 21 hold the door opener 19 in this position, the lateral tilt of the car takes place. As the lower end of the door opener 19 is held against lateral movement by the levers 21, the lateral tilt of the car body will result in prying off or forcing inwardly the boards comprising the grain door, and the door is thus opened to permit the discharge of the grain from the car. As the supporting pivots 20 at the upper ends of the door opener swing laterally in unison with the movement of the car while the lower end of the door pusher is held by the levers 21, the resultant motion of the door pusher will cause the door to be pushed upwardly as well as relatively inwardly, thereby raising the door above the car floor and providing an opening beneath the door, as well as openings at opposite sides of the door for the discharge of the grain.

The arms 10 which, as previously explained, move in unison with the bridge, also carry means for preventing the escape of dust through the upper portion of the opening 6 in the hopper. Preferably, and as shown in the present instance, such dust-confining means comprises a shield 24 which, as will be clear from Figure 4, is substantially flat and plate-like in form, this shield being provided with an opening 25 which communicates with the opening 6 in the hopper. The shield has a portion 26 which extends above the upper end of the arms 10 to an extent sufficient to lap and close the opening 6 in the hopper and it has portions 27 which extend beyond the outer sides of the arms 10 to an extent sufficient to lap and close the sides of the opening 6 in the hopper, these portions 27 of the shield being joined at 28 to the upper edge of the apron 7. The shield is swung away from the receiving hopper when the bridge is in its normal or operative position, as will appear from Figure 1, and it is fixed at such an angle on the arms 10 that when the bridge has reached the limit of its tilting movement toward the receiving hopper, the shield 24 will assume a position in parallelism with the opposed side of the hopper and will form a close fit therewith. When the parts are in this position, the shield in conjunction with the plates 11 and 12 will substantially close the entire space above the apron 7 and between the car and the receiving hopper.

In order to assist the closures in confining the dust or preventing its escape to the exterior air, means is provided for producing a pressure within the receiving hopper which is less than that of the outside air, thus causing inward draft of air through such crevices or openings as may remain. Furthermore, in order to avoid the loss of weight of the load, occasioned by the escape of dust which forms a part thereof, means is preferably provided to separate the dust from the air carrying it and to return the separated dust to the grain. In the present instance, a pair of air exhausters or blowers 29 are provided which are adapted to draw in air within the hopper and to exhaust such air through conduits 30. As shown, these exhausters or blowers are driven from a shaft 31 which may be actuated from an electric motor 32 or other suitable means. The conduits 30 are arranged to discharge the dust-laden air removed from the hopper into a pair of dust separators 33 which may be of the well-known cyclone type, these dust collectors operating in the usual way and serving to discharge the air from which the dust has been removed through conduits 34 to the outside air and returning the dust through conduits 35 to the receiving hopper, the dust being thereby returned to the grain.

It will be understood that the shield 24 is rotatable in unison with the endwise rotating or tilting movements of the bridge, the shield during said movements rotating with respect to the cooperating face of the receiving hopper. For example, the dotted lines in Fig. 4 indicate the position of the shield when the bridge is level or substantially so, and the full lines show the shield rotated in one direction to conform with the endwise tilt of the bridge to an angle of about 35° to the horizontal, such an angle of tilt ordinarily being sufficient to cause complete removal of the grain from the higher end of the car. The dust-confining closure is thus maintained effectively during the endwise tilting movements of the bridge.

The opening in the shield and the space provided between the plates 11 are sufficiently large to afford free access to the door opening in the side of the car and to enable grain deflectors or other desired apparatus to be introduced into the car or car door opening, as well as to provide ample space to accommodate the door opener and its operating means and the operating means for the closure comprising the plates 11 and 12. The openings in the shield and between the plates 11 and 12 moreover are of sufficient size to permit air to flow freely from the hopper into the car to take the place of the grain discharging therefrom and to allow dust-laden air to be removed from the car by the suction of the exhausters and passed onto the dust separators or collectors for the removal of the dust therefrom.

I claim as my invention:—

1. In a grain car unloader embodying a tiltable car carrying bridge and a hopper to receive grain discharged from the car, means adapted to be interposed between a car on said bridge and the receiving hopper to substantially close the space therebetween and thereby confine within the hopper dust from the discharging grain.

2. In a grain car unloader embodying a car carrying bridge tiltable laterally and endwise and a hopper to receive grain discharged from the car, means operative when the bridge is tilted laterally, to substantially close the space between the car and hopper and to maintain such closure during endwise tilting movements of the bridge.

3. In a grain car unloader embodying a car carrying bridge tiltable laterally and endwise and a hopper to receive grain discharged from the car, means carried by and tiltable with the bridge to form a dust-confining closure between a car on the bridge and the receiving hopper.

4. In a grain car unloader having a bridge to carry a car to be unloaded and tiltable both laterally and endwise, and a hopper to receive the grain discharged from the car, supports fixed to and tiltable with the bridge, and dust-confining means carried by said supports and co-operative with the receiving hopper.

5. In a grain car unloader having a bridge to position a car to be unloaded and tiltable both laterally and endwise, and a hopper to receive the grain discharged from the car, supports connected to tilt both laterally and endwise with the bridge, and dust-confining means positioned by said supports and movable thereby, during the lateral tilt of the bridge, into cooperative relation with the hopper, and rotatable relatively to the hopper during endwise tilt of the bridge to maintain its cooperative relation with the hopper.

6. In a car unloader having a laterally tiltable car-carrying bridge, a receiving hopper, and an apron tiltable with the bridge and operative to form a substantially grain-tight and dust-tight closure with the hopper while the bridge is tilted, dust-confining means operative to close the space above the apron between the car and the hopper when the bridge is tilted.

7. In a car unloader having a car-carrying bridge tiltable both laterally and endwise, a receiving hopper, and a grain-directing apron below the bridge and operative to form a substantially dust-tight closure with the hopper, dust-confining means above the apron movable into position to form a substantially dust-tight closure of the space between the car and the hopper when the bridge is tilted laterally and operative to maintain such closure during the endwise tilting movement of the bridge.

8. In a car unloader of the class described, the combination with a car-carrying bridge, of supports thereon spaced at a side of the position occupied by a car on the bridge, and closure means movable relatively to said supports in a direction toward a car on the bridge to close the space between said supports and the side of the car.

9. In a car unloader of the class described, the combination with a car-carrying bridge, and a hopper to receive grain discharged from a car on the bridge, of a dust-confining member movable into a position to substantially close the space between the floor of a car on the bridge and the bridge.

10. In a car unloader of the class described, the combination with a car-carrying bridge, and a hopper to receive grain discharged from a car on the bridge, of dust-confining means movable into position to form closures with the side of the car at opposite sides of the grain discharge door therein and to substantially close the space between the floor of the car and the top of the bridge.

11. In a car unloader of the class described, the combination of a bridge adapted to position a car to be unloaded, and a hopper to receive grain discharged from a door in the side of a car on the bridge, of supports connected to the bridge and spaced at the side of the position occupied by a car on the bridge, and dust-confining means comprising plates mounted on said supports and movable into engagement with the side of the car at opposite sides of the discharge door therein and a plate movable into a position to substantially close the space between the car body and the top of the bridge.

12. In a car unloader of the class having a laterally-tiltable car-carrying bridge and a receiving hopper, of dust-confining means movable automatically into operative position between a car on the bridge and the hopper in consequence of laterally tilting movement of the bridge.

13. In a car unloader of the class having a laterally-tiltable car-carrying bridge and a receiving hopper, of dust-confining means movable by gravity into operative position between a car on the bridge and the hopper in consequence of lateral-tilting movement of the bridge.

14. In a car unloader of the class having a laterally-tiltable car-carrying bridge, and a receiving hopper, dust-confining means operative to form a closure with the side of a car on the bridge, devices supporting said means whereby the weight of the latter will cause the same to move into closure-forming relation with the car, and means controlling said devices whereby the closure-forming means will be withdrawn from the car when the bridge is in normal upright position and the closure-forming means will be caused to move into closure-forming relation with the car when the bridge is tilted laterally.

15. In a car unloader of the class having a laterally-tiltable car-carrying bridge and a receiving hopper opposite thereto, a dust-confining shield mounted on the bridge at an angle which will cause the shield to form a dust-tight closure with the hopper when the bridge is tilted laterally.

16. In a car unloader of the class having a laterally and endwise tiltable car-carrying platform, and a receiving hopper opposite thereto, a dust-confining shield positioned at such angle relatively to the bridge that it will form a dust-tight closure with the hopper when the bridge is tilted laterally and will rotate relatively to the hopper while maintaining a dust-tight closure therewith during endwise tilting movements of the bridge.

17. In a car unloader of the class having a car-carrying bridge and a hopper to receive grain discharged from a car on the bridge, means to form a substantially dust-tight closure between a car on the bridge and the hopper, and means for producing an inward air draft through such openings as may exist.

18. In a car unloader, a hopper to receive material discharged from a car, means to form a substantially dust-tight closure between the car and hopper, and means for reducing the pressure within the hopper below that of the outside air.

19. In a car unloader, a hopper to receive material discharged from a car, means to form a substantially dust-tight closure between the car and hopper, and dust-separating means operative to remove dust-laden air from the hopper and to return the separated dust to the remainder of the discharged material in the hopper.

20. In a car unloader of the class having a laterally tiltable car-carrying bridge and a receiving hopper, supports mounted to tilt with the bridge, a door-opener suspended from said supports and movable into position to engage a door in the side of a car on the bridge, and abutment means to engage the door opener and to cause inward door opening movement of the door opener in consequence of lateral tilting movement of the bridge.

In testimony whereof I have hereunto set my hand.

HENRY RICHARDSON.